May 20, 1924.

F. W. T. ZOEPKE

HARVESTING MACHINE

Original Filed Feb. 18  1927   5 Sheets-Sheet 1

1,494,522

INVENTOR.
F.W.T.Zoepke
BY
ATTORNEYS.

May 20, 1924. 1,494,522
F. W. T. ZOEPKE
HARVESTING MACHINE
Original Filed Feb. 18 1922   5 Sheets-Sheet 3

INVENTOR.
F. W. T. Zoepke
BY
ATTORNEYS.

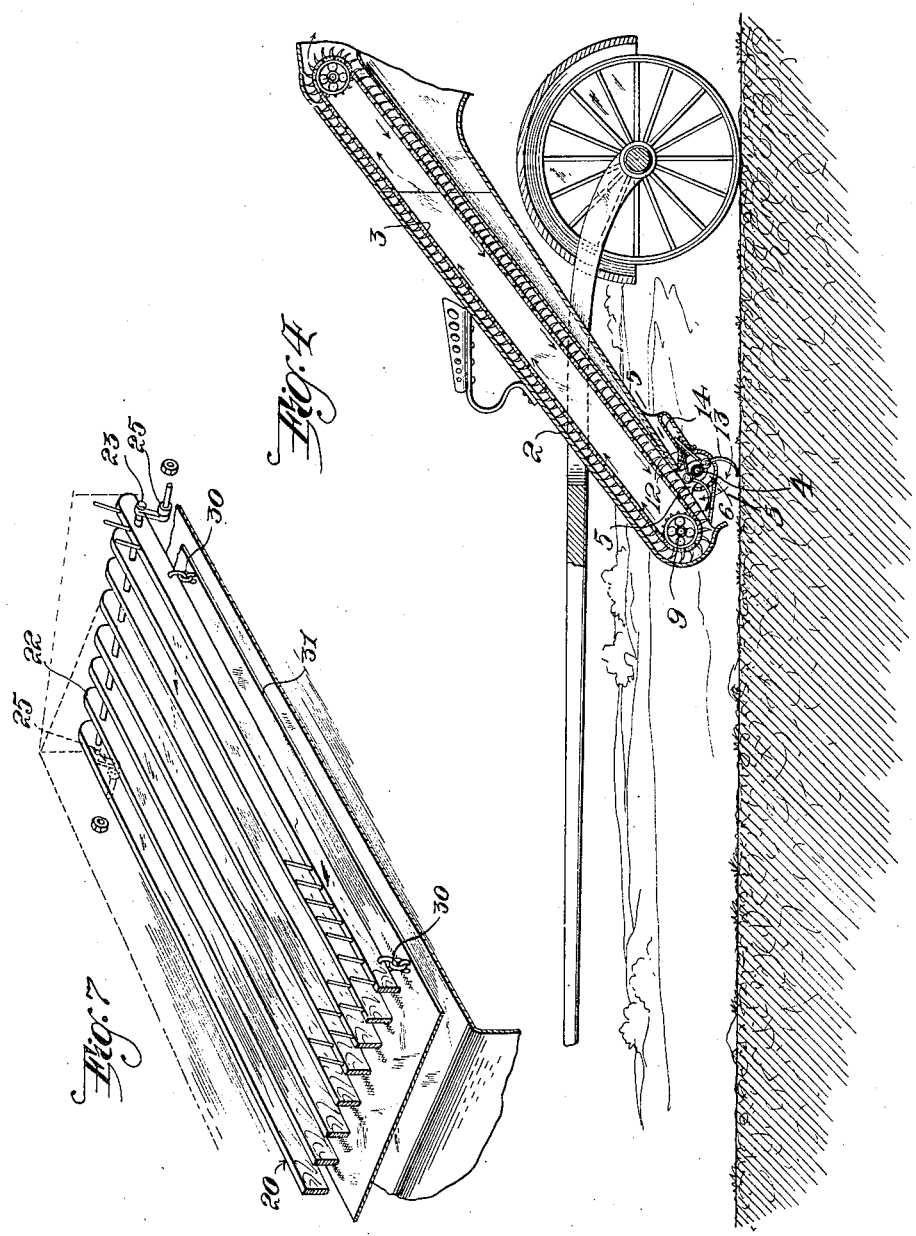

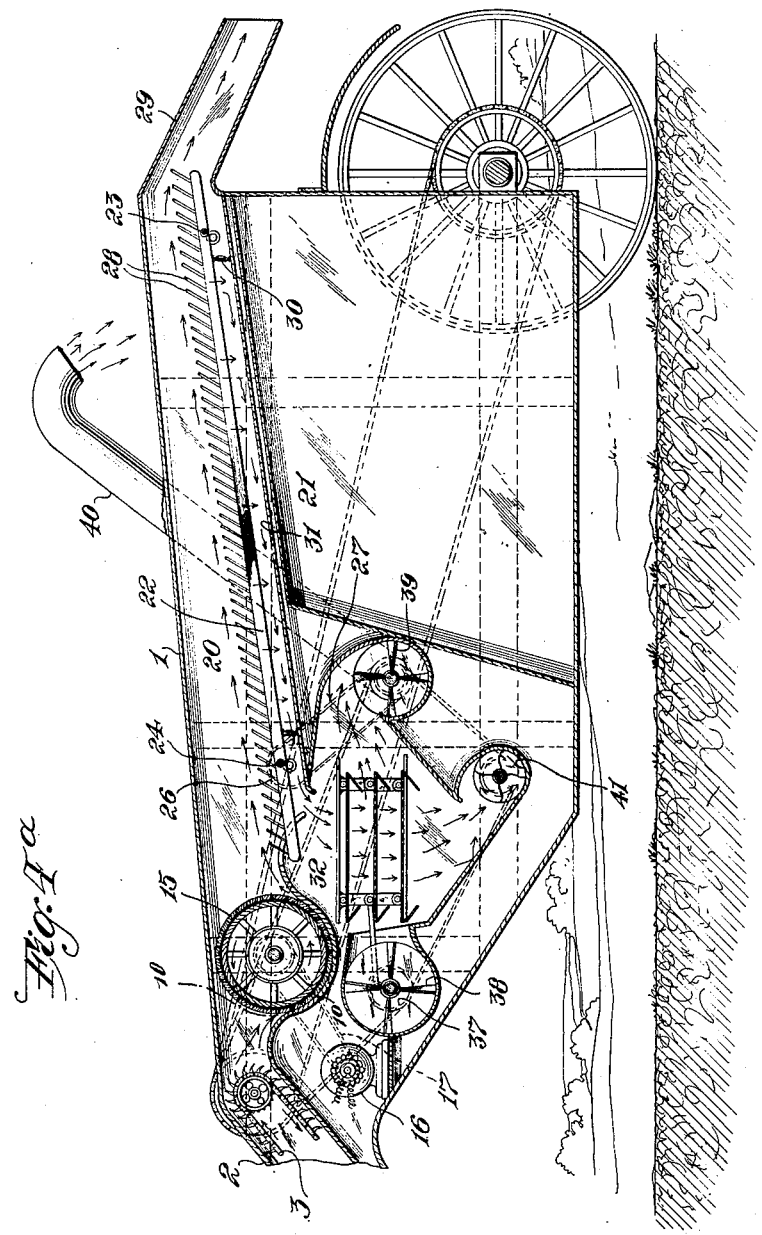

Patented May 20, 1924.

1,494,522

UNITED STATES PATENT OFFICE.

FRED WM. T. ZOEPKE, OF GREAT FALLS, MONTANA.

HARVESTING MACHINE.

Application filed February 18, 1922, Serial No. 537,519. Renewed March 26, 1924.

*To all whom it may concern:*

Be it known that I, FRED WILLIAM T. ZOEPKE, a citizen of the United States, residing at Great Falls, in the county of Cascade and State of Montana, have invented certain new and useful Improvements in Harvesting Machines, of which the following is a specification, reference being had therein to the accompanying drawings.

This invention relates to a thrashing or harvesting machine, and the object of the invention is the provision of means for efficiently separating the grain from the straw, and depositing the thrashed, cleaned grain in a compartment of the machine.

With this and other objects in view, my invention comprises certain novel combinations, constructions and arrangements of parts as will be hereinafter described, illustrated in the accompanying drawings, and more particularly pointed out in the appended claims.

In the drawings:

Figure 4 is a fragmentary, sectional view of the machine, showing the toothed conveyor in elevation, taken on line 4—4, Fig. 3.

Figure 3:
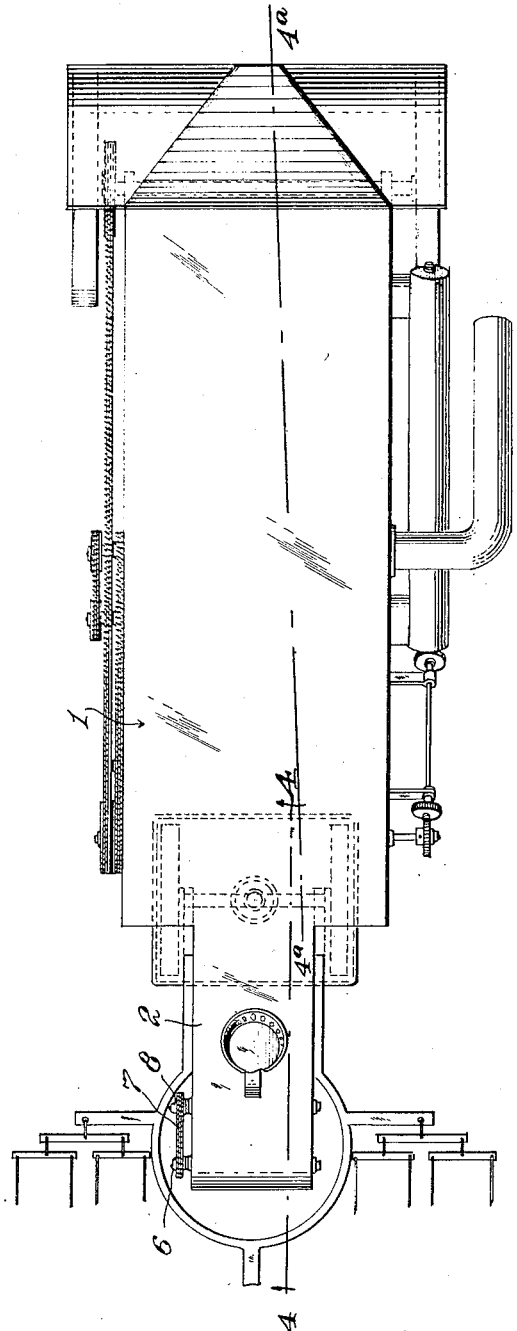
Figure 3 is a top. plan view of the machine.

Figure 4ª is a fragmentary, longitudinal, sectional view of the machine, taken on line 4ª—4ª, Fig. 3.

Figure 5 is a fragmentary sectional view of the machine showing in elevation the straw pick-up device, taken on line 5—5, Fig. 4.

Figure 6 is a view in elevation of one of the picker members.

Figure 7 is a fragmentary view of the machine, showing in perspective the straw-shaking device.

Figure 8 is a perspective view of the grain-screening device.

Figure 9 is a fragmentary, sectional view of one of the screens of the grain-screening device, taken on line 9—9, Fig. 8.

Figure 10 is a fragmentary sectional view of the machine showing in elevation the hulling roller, taken on line 10—10, Fig. 4ª.

Figure 2:
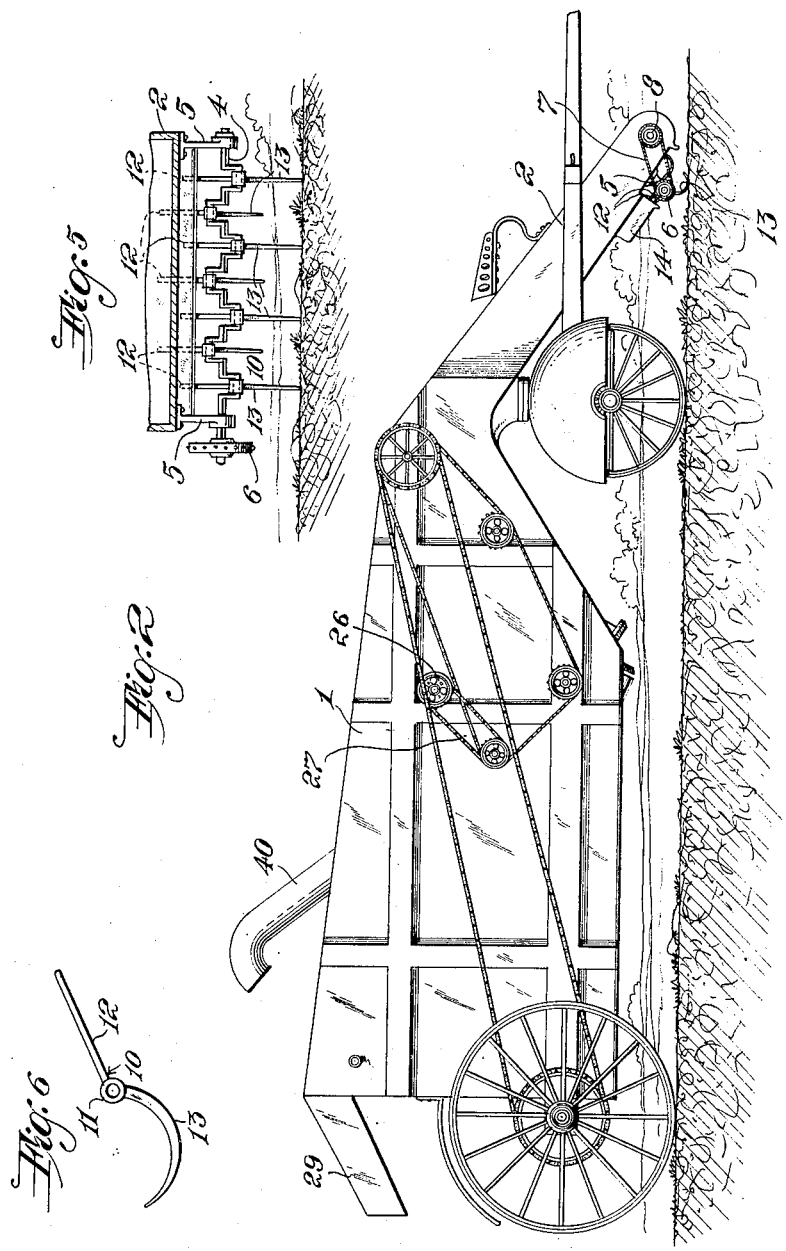
Figure 2 is a view, in side elevation, of the righthand side of the machine.

Referring to the drawings by numerals, 1 designates the main casing of the machine, which is supported upon a suitable carriage including the front and the rear wheels, common to a harvesting or thrashing machine. The casing 1 is provided with a forwardly-extending portion 2 in which the toothed, grain conveyor 3 is positioned. Upon the lower end of the extension 2, of the casing 1, is journalled a crank shaft 4, this shaft being carried by the brackets 5, Fig. 5, and the shaft 4 is driven through the medium of a sprocket wheel 6, upon which is mounted chain 7 (Figs. 2 and 3) which chain is also carried by sprocket wheel 8; the sprocket wheel 8 is fastened to shaft 9 of the toothed conveyor 3, and as the conveyor 3 is driven through the medium of the ordinary gearing carried on the side of the casing 1, connected to the rear axle, I am not specifically describing this gearing. On the crank shaft 4 are a plurality of picker members 10. Each picker member includes hub 11, arm 12 and tooth 13. The arms 12 extend into the guiding pocket 14 (Fig. 4) of the casing and prevent the picker member from moving too far out of place, keeping the picker members in position for picking up the straw as the machine passes over the ground, raising the straw, as shown by the arrows in Fig. 4, until the straw is taken up by the toothed conveyor. The teeth 13 of the pick-up device, clean the ground of the straw and hold the straw against the teeth of the conveyor 3, allowing the teeth to gather up the straw off the teeth 13 of the picker members 10, making a very clean operation for permitting the machine to gather up the cut straw and take it into the machine. It is to be understood that the grain cut is preferable left in rows on the ground and the pick-up device takes the straw, in a row, or rows, and forces it against the toothed conveyor 3.

From the conveyor 3, the straw is discharged against the hulling roller 15, which roller is driven continually through the medium of motor 16 (Fig. 4ª), this motor being connected by chain 17 to the sprocket wheel 18 of the hulling roller 15, Fig. 10. The hulling roller is provided in its surface with spirally-arranged parallel grooves 19, which allow the seed, or grain, to be received as the straw is crushed, without crushing the grain or seed.

From the hulling roller 15, the grain and straw is discharged onto the straw-shaking device 20.

The straw-shaking device 20 is mounted above a grain-receiving compartment 21 in the casing 1 of the machine. The straw-shaking device comprises a plurality of parallel slats 22, constituting a rack for receiving the straw. The slats 22 are mounted on a shaft 23 at their outer ends and at their inner ends they are mounted on shaft 24. These shafts 23 and 24 have crank ends 25 (Fig. 7), allowing the rack, constituted by the slats 22, to have a forward and backward movement, as the wheel 26 is rotated by means of belt 27 driven through the medium of the chain and gear connected to the rear axle mounted upon the side of the casing 1, Fig. 2. On each slat 22 are upstanding pins 28; these pins 28 are slightly inclined toward the rear end of the casing 1. Communicating with the rear end of the straw-shaking device is discharge spout 29. Suspended by a link, or chain connection 30, from the slats 22, is a sheet of metal, constituting a pan 31, upon which the grain drops from the straw, as the straw passes toward the discharge end of the casing, the grain passing downward on this inclined pan and being discharged upon the grain-screening device 32. It will be noted that this movement of the straw-shaking device slightly rearward and then forward will create movement of the straw toward the rear end of the casing 1 and at the same time the pan 31 will be continuously shaken to shift the grain falling thereon continuously toward the grain-screening device 32, while the machine is in operation.

Figure 1:
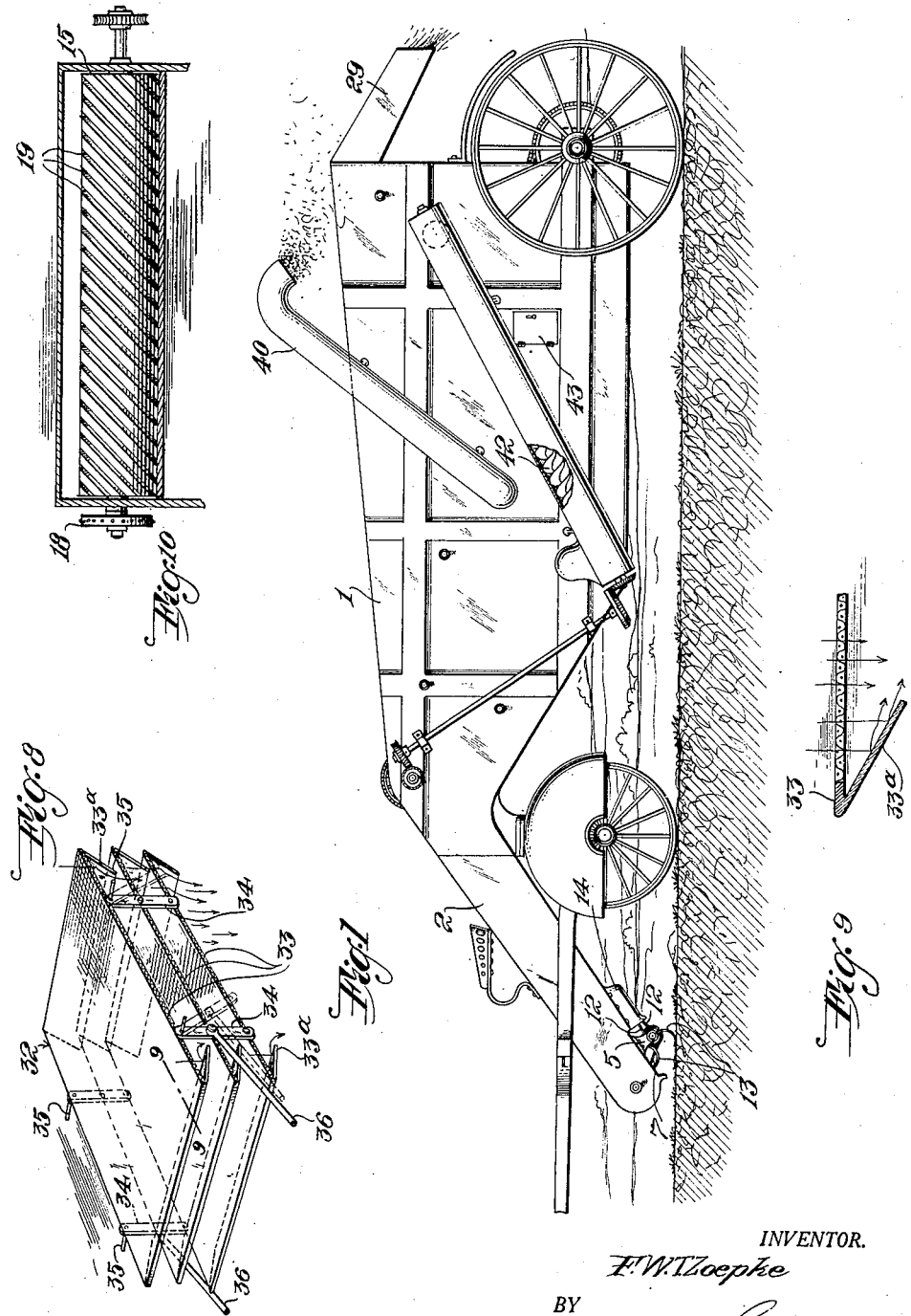
Figure 1 is a view, in side elevation, of the lefthand side of the machine.

The grain-screening device 32 comprises a plurality of screens 33, of similar construction, except that the top screen is of larger mesh than the middle screen and the middle screen is of larger mesh than the lowest screen. The screens are pivotally mounted on vertical supporting-bars 34, and by means of pins 35, the screen device 32 is pivotally supported upon the casing 1. Rods 36 are pivotally connected at one end to some of the bars 34, and these rods 36 are also connected to wheels 37 within the casing 1, Fig. 4ª; I make no claim to the specific connection of the rods 36, as any ordinary means for shaking the screening device 32 may be employed for operating the rods 36. Each screen 33 is provided with downwardly and inwardly-extending ends 33ª so that the air from the fan 38, Fig. 4ª, will be forced down close to the top of the two lower screens for blowing the chaff or dirt off the grain; the speed of the fan 38 will govern the force of air passing over the grain on the grain-screening device. Dirt or chaff from the screening device will be sucked up by the fan 39 and discharged through spout 40. The grain dropping from the screening device 32 will be taken up from the portion 41, Fig. 4ª, by the screw conveyor 42, Fig. 1, and thence discharged at the upper end of the conveyor into the compartment 21 of the casing 1. By means of a door 43, the grain may be removed from the compartment 21.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In a machine of the class described, the combination with a casing, of a toothed conveyor carried by said casing, a pair of brackets attached to said casing, a crank shaft journalled upon said brackets, said casing being provided near the shaft with a guiding pocket, a plurality of picker members loosely mounted upon the crank shaft, each picker member being provided with a tooth and with an arm, the arms of the picker members extending into said guiding pocket, and means for operating the picker members and the conveyor for causing the picker members to lift cut grain or straw from off the ground and bring it in contact with the toothed conveyor and thence cause the toothed conveyor to discharge the straw into the machine.

2. In a machine of the class described, the combination with a casing, of a conveyor carried by said casing, a crank shaft contiguous to said casing, means journaling said crank shaft upon said casing, said casing being provided near said shaft with guiding means, a picker device loosely mounted upon said crank shaft, said picker device provided with means engaging said guiding means, and means operating said picker device and the conveyor for causing the picker device to lift cut grain or straw from off the ground to bring it in contact with said conveyor and thence cause the conveyor to discharge the straw into the machine.

In testimony whereof I hereunto affix my signature.

FRED WM. T. ZOEPKE.